United States Patent [19]

Bish

[11] Patent Number: 5,166,935
[45] Date of Patent: Nov. 24, 1992

[54] METHOD OF DETERMINING CORRECTNESS AND CONTENTS OF CONTROL DATA STRUCTURES IN MOVING MEDIA DATA STORAGE SYSTEMS

[75] Inventor: John E. Bish, Tucson, Ariz.

[73] Assignee: International Business Machines Corporation, Armonk, N.Y.

[21] Appl. No.: 589,707

[22] Filed: Sep. 28, 1990

[51] Int. Cl.[5] .......................... G11C 29/00; G06F 7/02
[52] U.S. Cl. .................................... 371/21.6; 371/67.1
[58] Field of Search ..................... 371/21.6, 67.1, 10.2; 364/245.3, 265

[56] References Cited

U.S. PATENT DOCUMENTS

| | | | |
|---|---|---|---|
| 4,656,532 | 4/1987 | Greenberg et al. | 360/48 |
| 4,750,106 | 6/1988 | Aiken, Jr. | 364/200 |
| 4,814,903 | 3/1989 | Kulakowski et al. | 360/48 |
| 4,862,295 | 8/1989 | Tanaka et al. | 360/48 |
| 5,005,165 | 4/1991 | Yamanaka et al. | 371/21.6 |

FOREIGN PATENT DOCUMENTS

0248536A2  9/1987  European Pat. Off. .
0432137A2  12/1991  European Pat. Off. .

Primary Examiner—Vincent P. Canney
Attorney, Agent, or Firm—H. F. Somermeyer

[57] ABSTRACT

An optical disk has four copies or sets of its control data structures. The control data structure includes a disk definition structure DDS, a primary defect list PDL, and a secondary defect list SDL. Procedures are described for checking to whether or not all copies of the data structures have congruence. If not, all the tables are then made congruent and re-recorded on a disk. In the procedure, the copy having the greatest number of entries is first examined for determining whether or not congruence is possible. If congruence is not possible from the longest copy, then the next longest copy is used.

4 Claims, 3 Drawing Sheets

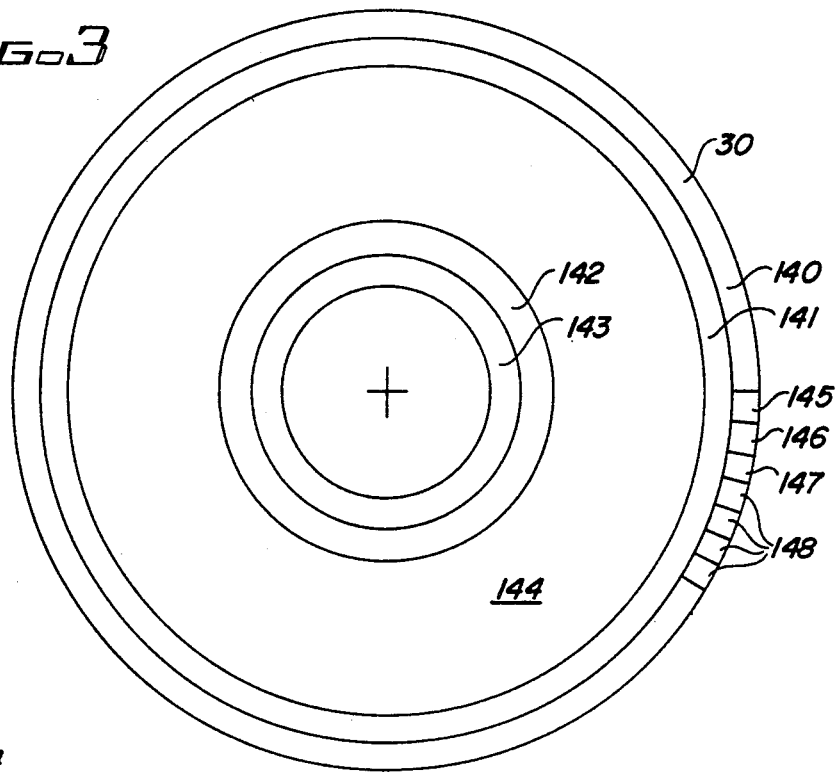
FIG. 3
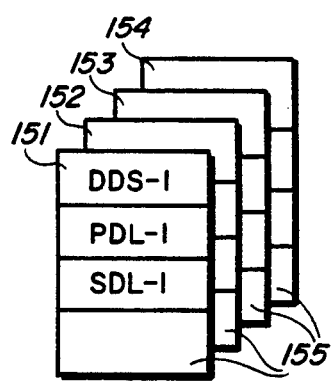
FIG. 4
FIG. 5
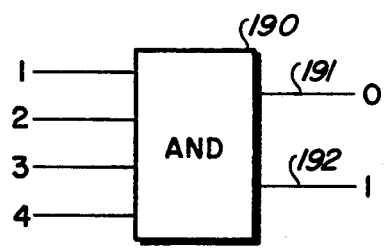
FIG. 7
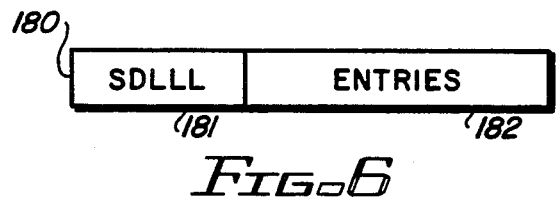
FIG. 6

METHOD OF DETERMINING CORRECTNESS AND CONTENTS OF CONTROL DATA STRUCTURES IN MOVING MEDIA DATA STORAGE SYSTEMS

FIELD OF THE INVENTION

The present invention relates to moving media data storage systems, particularly to those storage systems having a plurality of copies of control data structures on each medium.

BACKGROUND OF THE INVENTION

The present invention is described in the context of an optical disk recorder. Before an optical disk can be used, either written to or read from, the disk definition tracks must be first read from the disk so that the disk's format and locations of defects are known before operations ensue. The definition tracks store sets of tables. Each set of tables is copied four times. There are two copies at the disk inner diameter and two copies at the disk outer diameter. Each set of tables has three tables or ordered lists. A first table is a disk definition structure (DDS) which is the directory of the data stored on the disk as well as locations of other system information. A primary defect list (PDL) identifies those sectors on the disk that were defective at the disk certification. The third table is the secondary defect list (SDL) which lists the sectors which became defective after certification. In the illustrated embodiment of this application, the DDS and the PDL are respectively stored in separate sectors in each copy.

It is extremely important to the successful operation of the data storage system employing such an optical disk that all four copies or sets have congruence. If any one copy is incomplete, then errors can occur during operations. The tables on each disk can be constructed in accordance with the proposed American Institute (ANSI) proposed standard having internal identification number X3B11/89-120. This proposed standard was sent for distribution for public comment under number X.192-199X. This proposed standard relates to 3.5 inch magnetooptic disk data storage systems.

A prior method of reading the control data structures described above is described in the proposed ANSI standard. Each set of tables is read sequentially. If a full set of tables can be read, then no attempt is made to read another set of tables, i.e., the first successfully read set of tables is used in disk storage operations. There was no ability to combine tables if a defective sector exists in anyone of the sets of tables. A defect in each of the sets of tables could make the disk unaddressable because the contents of these tables would be unknown for at least one portion of the disk. It is desired to provide for maintaining the integrity of the four copies of the control data structures and for ensuring congruence among the copies.

SUMMARY OF THE INVENTION

In accordance with the present invention a method of operating a moveable optical storage system, which has a medium with the plurality of addressable storage areas (sectors) includes electronically storing a plurality of copies of predetermined control data structures on the medium in predetermined ones of the data storing areas. During operations, the copies of the control data structures are updated. For ensuring integrity, four sets of all data structures are copied electronically from the disk to a programmed machine. During such copying it is electronically noted which of the addressable data storage areas storing the data structures were not readable. If all of the data storage areas were readable then no further action occurs. If any of the predetermined data storage areas storing the data structures were not readable, then in the programmed machine the method includes electronically detecting which of the copies has the largest number of entries. Then the programmed machine electronically determines if any copy of the unread data which has to be stored in the unread data storage areas is currently stored in any readable data storage area; then within the programmed machine a copy of the data from the readable areas is stored in the portion of the programmed machine assigned data storage to store the unreadable sector. Then after all sets are congruent, all copies or sets of the data structure are then rewritten into the storage medium.

The foregoing and other objects, features, and advantages of the invention will be apparent from the following more particular description of preferred embodiments of the invention, as illustrated in the accompanying drawings.

BRIEF DESCRIPTION OF THE DRAWINGS

FIG. 3 is a diagrammatic showing of an optical disk in which the four copies of data structures are stored.

FIG. 4 is a diagrammatic showing of the four sets of control data structures manipulated in accordance with the present invention and the illustrated embodiments.

FIG. 5 is an abbreviated showing of a bit map used in practicing the present invention in the illustrated embodiment.

FIG. 6. is an abbreviated showing of an SDL entry used in the FIG. 2 illustrated disk recorder.

FIG. 7 is a illustration of a logic function used in analyzing the FIG. 5 illustrated bit map.

DETAILED DESCRIPTION OF THE DRAWINGS

Figure 1:
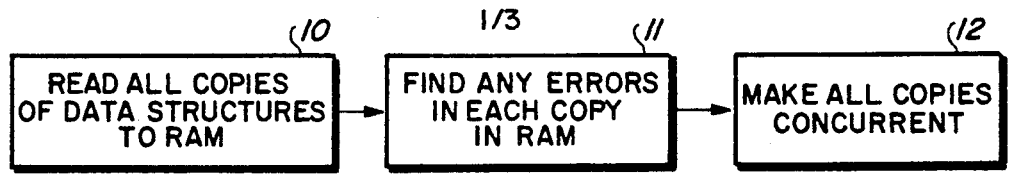
FIG. 1 is an abbreviated flow chart showing the principles of the present invention.
Figure 2:
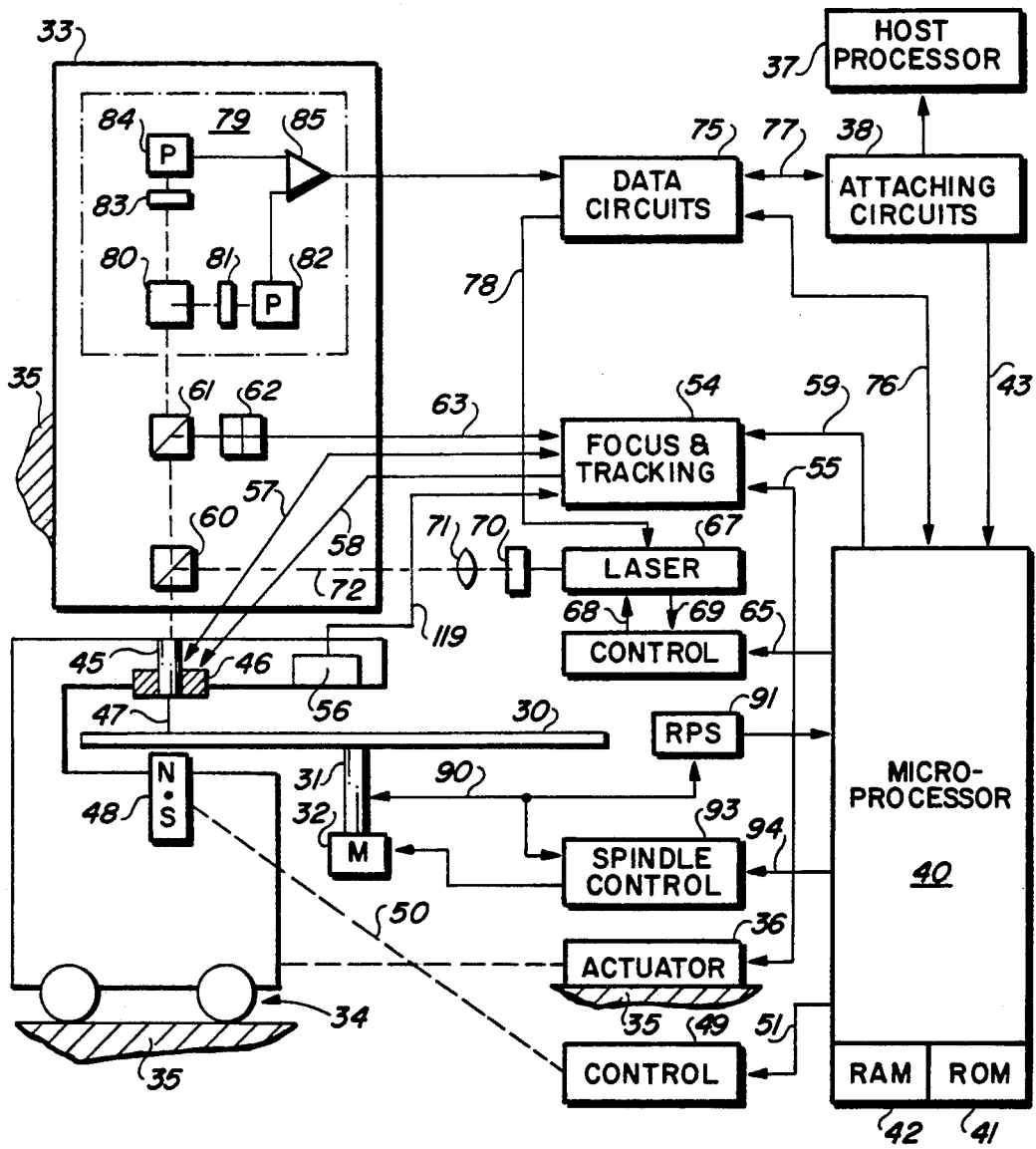
FIG. 2 is a block diagram of an optical disk recorder embodying the invention and in which the invention is advantageously employed.

Referring now more particularly to the appended drawing like numerals indicate like parts, structural features, and functions in the various figures. In FIG. 1, numeral 10 denotes a first phase of practicing the present invention in which all copies of the control data structures stored are on optical disk 30 (FIG. 2) are read from the disk into a random access memory (RAM). Such a RAM (not separately shown) is found in a host processor 37 (FIG. 2). During the reading, any sectors of disk 30 that are unreadable are noted and that portion of RAM in host processor 37 which were to receive the data to be read is left blank for receiving control data read from another set of the tables. A bit map 156 (FIG. 5) is constructed indicating which of the sectors of disk 30 have been successfully read and which have not been successfully read.

At machine step 11, any error in each copy of the data structures are identified and located. Further, good copies of such data which were to be stored in the unreadable sector are identified and supplied to the respective copies of the data structures in RAM. This copying makes the set copies in RAM congruent. In step 12, the congruent copies of the data structures are then written to disk 30.

Before going into the details of how the procedures and criteria are effected in accordance with the present invention, the environment in which the present invention is advantageously practiced is shown in FIG. 2. A magnetooptic record disk 30 is mounted for rotation on spindle 31 by motor 32. Optical portion 33 is mounted on frame 35. A headarm carriage 34 moves radially of disk 30 for carrying an objective lens 45 from track to track. A frame 35 of recorder suitably mounts carriage 34 for reciprocating radial motions. The radial motions of carriage 34 enable access to any one of a plurality of concentric tracks or circumventions of a spiral track for recording and recovering data on and from the disk. Linear actuator 36 suitably mounted on frame 35, radially moves carriage 34 for enabling track accessing. The recorder is suitably attached to one or more host processors 37, such host processors may be control units, personal computers, large system computers, communication systems, image signal processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42.

The optics of the recorder include an objective or focusing lens 45 mounted for focusing and radial tracking motions on headarm 33 by fine actuator 46. This actuator includes mechanisms for moving lens 45 toward and away from disk 30 for focusing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnet 48 in a constructed embodiment (magnet 48 is an electromagnet) provides a weak optical steering field for directing the remnant magnetization direction of a small spot on disk 30 illuminated by laser light from lens 45. The laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables magnet 48 to direct the remnant magnetization to a desired direction of magnetization as the spot cools below the Curie point temperature. Magnet 48 is shown as oriented in the "write" direction, i.e., binary ones recorded on disk 30 normally are "north pole remnant magnetization". To erase disk 30, magnet 48 rotates so the south pole is adjacent disk 30. Magnet 48 control 49, which is operatively coupled to rotatable magnet 48 as indicated by dashed line 50, controls the write and erase directions. An electromagnetic control is preferred to provide the magnetic erasing. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the fine actuator 46 control by circuits 54 is exercised through control signals travelling to fine actuator 46 over lines 57 and 58, respectively for effecting respective focus and track following and seeking actions. Sensor 56 senses the relative position of fine actuator 46 to headarm carriage 33 to create a relative position error (RPE) signal. Line 57 consists of two signal conductors, one conductor for carrying a focus error signal to circuits 54 and a second conductor for carrying a focus control signal from circuits 54 to the focus mechanisms in fine actuator 46.

The focus and tracking position sensing is achieved by analyzing laser light reflected from disk 30 over path 47, thence through lens 45, through one-half mirror 60 and to be reflected by half-mirror 61 (which includes a quarter wave plate facing splitter 60) to a so-called "quad detector" 62. Quad detector 62 has four photoelements which respectively supply signals on four lines collectively denominated by numeral 63 to focus and tracking circuits 54. Aligning one axis of the detector 62 with a track center line, track following operations are enabled. Focusing operations are achieved by comparing the light intensities detected by the four photoelements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser, such as a gallium-arsenide diode laser, can be modulated by data signals so the emitted light beam represents the data to be recorded by intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplying suitable control signals over line 76. Microprocessor 40 in preparing circuits 75 is responding to commands for recording received from a host processor 37 via attaching circuits 38. Once data circuits 75 are prepared, data is transferred directly between host processor 37 and data circuits 75 through attaching circuits 38. Data circuits 75, also ancillary circuits (not shown), relating to disk 30 format signals, error detection and correction and the like. Circuits 75, during a read or recovery action, strip the ancillary signals from the readback signals before supply corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the headarm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photocell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photocell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer or emitter sensor 90. Sensor 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the optical data storing disks. Additionally, the sensor 90 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

FIG. 3 shows disk 30 having two areas 140 and 141 on the outer radius of the disk for storing two sets or copies of control data structures, each set contains the DDS, PDL, and SDL as described earlier. The other two copies are stored at the inner radial areas 142 and 143. Data storage in disk 30 is in sectors as indicated by numerals 145-148. Data is stored in area 144 in sectors as used. In the control area 140, the sector 145 stores a copy of DDS. Sector 146 stores the PDL while sector 147 stores the first sector of SDL. Numeral 148 indicates additional sectors may be used for storing the SDL. Since the SDL stores the secondary or later created defects, the number of such defects may be sufficiently large to require several sectors.

FIG. 4 illustrates, in diagrammatic form, the four sets or copies of the control data structures DDS, PDL, and SDL respectively indicated by numerals 151-154. An area at the bottom of each copy indicated by numeral 155 is an expansion area for each set. While copying the four sets of the control data structures from disk 30 to host processor 37 whether or not the sectors storing the respective data structures were readable is noted. This notation consists of constructing a bit map 156 shown in FIG. 5. For each sector that is successfully written, a binary zero is stored in a predetermined bit position while for an unread sector or a bad sector, the binary one is stored. Numerals 161-165 respectively denote rows of the bit map 156 which represent the readability status from disk 30 of the respective four sets of the control data structures. Each small rectangle containing the symbols DDS, PDL, SDL, or SDLA represent one bit in the bit map. It is assumed for purposes of description that the DDS and PDL require only one sector for storage. The columns of the bit map 156 correspond to the informational content of the sectors in the respective copies 161-165. Numeral 171 through 173 denote three columns respectively which represent storage of the DDS, PDL, and SDL. Since the SDL can be expanded, numeral 174 indicates the column SDLA which is a second sector for storing defect location indications. Numeral 175 indicates additional columns which may be added whenever the set grows larger than indicated.

FIG. 6 shows the format of each SDL sector 180. A first portion 181 stores the secondary defect list's logical length (SDLLL) which indicates the number of entries in the SDL. Other information may be included in SDL, such as additional header information. The remainder of these respective sectors indicated by numeral 174 contain defect location entries as indicated by numeral 182. Since the SDL may expand during operation of the illustrated data storing system, the SDLLL indicates the number of entries in the event that not all copies 151-154 were appropriately updated. Some of the sets or copies of the tables may have a greater number of entries than the others. Procedures of the present invention accommodate such variation among the sets.

FIG. 7 illustrates an AND function 190 which is used to determine whether or not there is at least one good copy of the sector such as the sectors represented by the bits in column 171 of bit map 156. Numerals 1-4 in FIG. 7 represent the inputs of the four bits in each column of bit map 156. For example, in column 171 the 1, 2, 3, 4 represent the bits in the DDS box for the rows 161-165. If any of the bit positions in column 171 are zero, then the AND function of all ones is not met resulting in an active signal being supplied over line 191 indicating there is somewhere in the RAM of host processor 37 a good copy of the sector data which indicates that any data for an unread sector, as indicated by binary one in row 163 in column 171, can be replaced by writing such data from a good sector such as in row 161, later this data can be re-written on disk 30. This action becomes more apparent from the description of FIG. 8. On the other hand, when all bits in any column are all ones, then a signal supplied over line 192 indicates there are no valid copies of the data from the sectors being examined. For example, if in column 174 the SDLA, a second sector storing SDL information, were all ones then no valid copy of data exists for SDLA resulting in a permanent error condition. Recovery from such an error is beyond the present description.

Figure 8:
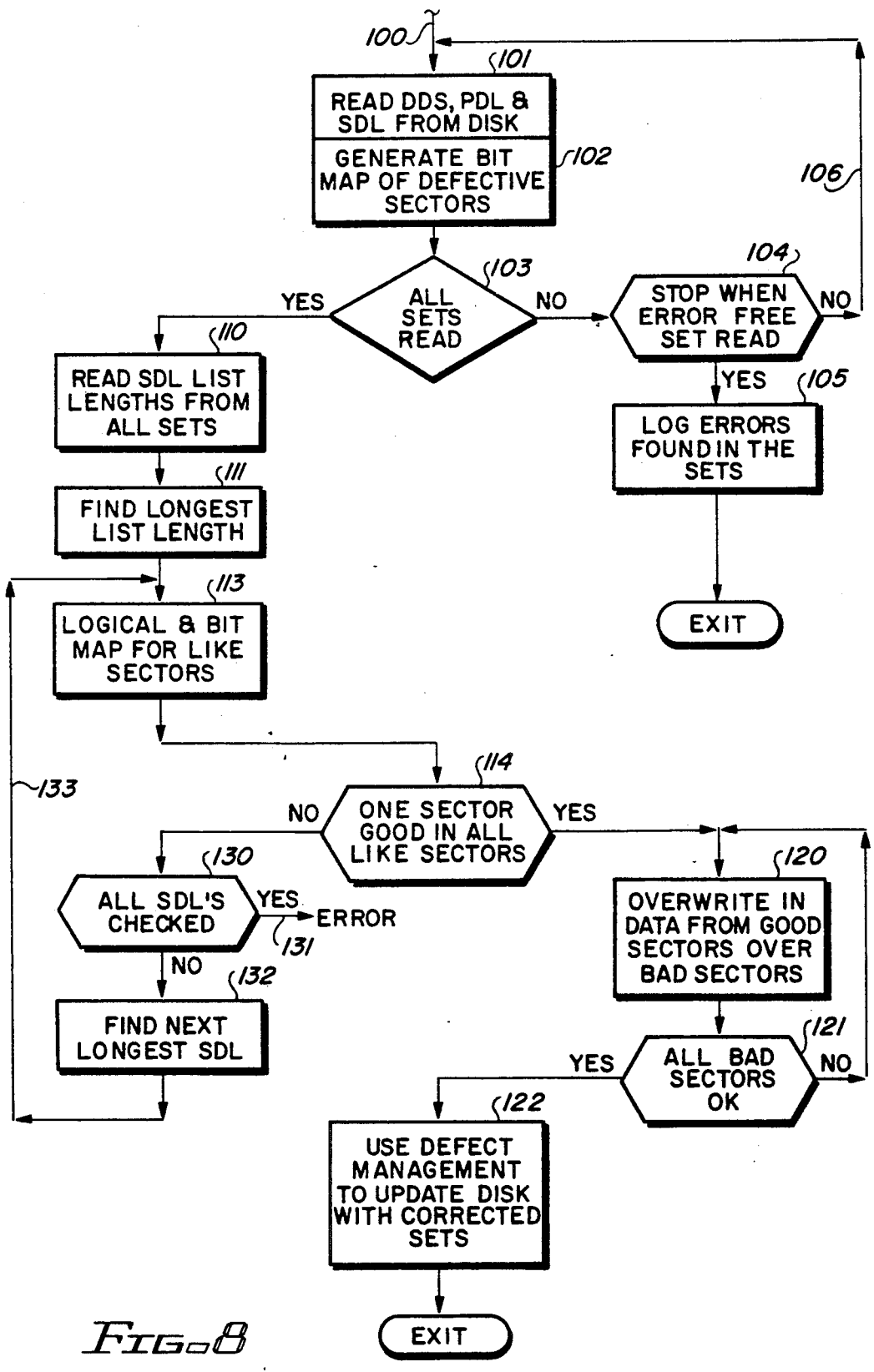
FIG. 8 is a machine operations flow chart showing practicing the present invention.

Referring next to FIG. 8 a machine operations chart shows the operation of the present invention. At numeral 100, the host processor 37 has asked the disk control, i.e., microprocessor 40, to read the data of the data structures from disk 30 into host processor 37 for processing. At step 101 a set of the data in the data structures DDS, PDL and SDL are read from disk 30 into host processor 37. Concurrent to that reading or thereafter, a bit map of defective sectors is generated at machine step 102. That is, each time the optical disk 10 recorder finds it cannot read or error correct data from any sector storing a portion of the data structures, then a binary one is indicated in the bit map 156. Steps 101 and 102 are for reading one set of the four sets of control data structures. At step 103 it is determined by the disk controller (microprocessor 40) whether or not all of the sets or copies of the control data structures have been read into host processor 37. If not, then at machine step 104, whether or not the operations be halted when any one copy has been read entirely error free, i.e., all bits in the bit map of a row in map 156 are zeros. If this is the case, then at step 105 any errors that were found previous to the successful reading of all data of one copy of the control data structure is logged and the process is exited. However, if a full congruence between all four sets is desired, then from machine step 104 path 106 is followed to read additional copies by repeating steps 101-103.

After reading all of the sets, at machine step 110, the SDL lists lengths (SDLLL) 181 are read from all sets or copies of the control data structures. SDLLL 181 appears in the first sector storing SDL. At machine step 111, the longest list length is found, i.e., the list having the greatest number of entries. By selecting the greatest number of entries, it is ensured that a latest copy of the data in SDL is to be used in processing the data structure information. It is assumed that the longest one is the most recent. Such may occur whenever a writing process is interrupted by a loss of power or some other system turn off operation. It should be noted that the order in which the copies are updated is not predetermined and therefore, could be any copy of the four sets of data structures. At machine step 113, logical bit map 156 is examined as explained with effect to FIG. 7, i.e., the bits in each column are ANDed. At machine step 114, it is determined whether or not there is one good sector in all like sectors, i.e., there is at least one binary zero in the bit map 156 in all of the columns 171-175. If the answer is yes, then at machine step 120 at least one good sector of data is overwritten in host processor 37 RAM (RAM not separately shown) in the good sectors for making all four sets of the data structures stored in host processor 37 congruent. At machine step 121 it is determined whether or not all bad sectors were now OK as stored in host processor 137. If not, the overriding continues until the complete set of data structures has been made congruent. Upon completion of the congruence operation, at machine step 122 a defect management system (not shown) causes the disk 30 to be updated by the congruent copies of the four sets of control data structures currently stored in host processor 37. This disk operation completes the integrity reestablishment of the data structures.

Returning to machine step 114, if not all sectors are indicated as being good, then at machine step 130, the host processor 37 determines whether or not all SDL copies were checked. If yes, a permanent error is indicated by numeral 131. If not, then at machine step 132 it finds the next longest SDL copy and as indicated by numeral 133 steps 113-130 are repeated until either the steps 120-122 are performed or an error is indicated by numeral 131.

It should be noted that data in the respective PDL copies (different sectors) can be derived from any set of the tables, however, the SDL respective sectors must be transferred from sectors from other copies or sets to ensure congruence. It should be noted that the DDS and PDL copies should be the same in all sets regardless of age of the medium, however; for the SDL sectors there can be differences. It should be noted that the set 151-154 of tables with the fewest errors can be corrected the quickest. The table with the fewest defective sectors can be found by merely counting the bits equal to one in the respective rows 161-165 of bit map 156.

While the invention has been particularly shown and described with reference to preferred embodiments thereof, it will be understood by those skilled in the art that various changes in form and details may be made therein without departing from the spirit and scope of the invention:

What is claimed is:

1. In a machine-effected method of operating movable medium data storing system, the medium having a plurality of addressable data storing areas, including the machine-executed steps of:

electronically storing a plurality of copies of the predetermined control data structures on the medium in predetermined ones of the data storing areas; updating the copies beginning with updating a predetermined one of the copies;

electronically copying all of the data structures from the predetermined data storing areas into a programmed machine and electronically noting which of the addressable data storing areas storing areas were not readable;

if any of the predetermined data storing areas were not readable, in the programmed machine, electronically detecting which of the copies has the largest number of entries, for the unreadable data storing areas, electronically determining if any copy of the unread data which was to be stored in the unreadable data storing area is in a readable data storing area storing another copy of said unread data and storing the copy of said unread data from said readable data storing area into the copy of the data structures stored in the programmed machine subjected to the error of unread data; and storing all of the copies of the data structures onto the medium in writeable and readable data storing areas thereof.

2. In the machine-effected method set forth in claim 1 further including the machine-executed steps of:

selecting said medium to be an optical disk of the magneto optic type;

selecting said plurality to be four; and during said copying and noting of the data structures from the medium, electronically building a bit map of the predetermined data storing areas and electronically indicating in the bit map whether or not respective ones of the data storing areas were successfully read or not.

3. In the machine-effected method set forth in claim 2 further including the machine-executed steps of:

selecting each of the data storing areas to be sectors on the optical disk;

selecting said data structures to be a disk directory structure DDS storable in a first one of the sectors, a primary defect list PDL storable in a second one of the sectors, and a secondary defect list SDL storable in a third and other ones of the sectors;

electronically building said bit map in four rows of bits, each row of bits indicating the respective sectors storing said DDS, PDL and SDL in said respective four copies and aligning in respective columns the bits representing said DDS, PDL and SDL, electronically indicating unread data in the bit map by a first unit of information and each sector from which data were successfully read by second unit of information; and to identify said unread sectors, electronically ANDing all bits in each of the columns for indicating whether or not at least one copy of the data structures has read data for the respective unread sectors.

4. In the machine-effected method set forth in claim 3 further including the machine-executed steps of:

if in said electronically ANDing step, some of the sectors in said longest copy have no corresponding sectors from which data were read, then selecting a next longest copy and repeating the ANDing step.

* * * * *